(12) United States Patent
Synowicki

(10) Patent No.: US 12,449,351 B1
(45) Date of Patent: Oct. 21, 2025

(54) METHOD OF DETERMINING ABSORPTION AND EXTINCTION COEFFICIENT OF PRISM SHAPED MATERIAL

(71) Applicant: Ronald A. Synowicki, Lincoln, NE (US)

(72) Inventor: Ronald A. Synowicki, Lincoln, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 353 days.

(21) Appl. No.: 18/445,134

(22) Filed: Apr. 24, 2023

Related U.S. Application Data

(60) Provisional application No. 63/338,231, filed on May 4, 2022.

(51) Int. Cl.
*G01N 21/27* (2006.01)
*G01N 21/25* (2006.01)
*G01N 21/41* (2006.01)

(52) U.S. Cl.
CPC ........... *G01N 21/255* (2013.01); *G01N 21/27* (2013.01); *G01N 21/4133* (2013.01); *G01N 2201/061* (2013.01)

(58) Field of Classification Search
CPC .. G01N 21/255; G01N 21/27; G01N 21/4133; G01N 2201/061
See application file for complete search history.

(56) References Cited

U.S. PATENT DOCUMENTS

| | | | |
|---|---|---|---|
| 7,280,194 B1 * | 10/2007 | Herzinger | G01N 21/4133 356/135 |
| 8,692,985 B1 * | 4/2014 | Synowicki | G01N 21/4133 356/135 |
| 10,309,897 B2 * | 6/2019 | Synowicki et al. | |
| 2017/0254748 A1 * | 9/2017 | Synowicki et al. | |

FOREIGN PATENT DOCUMENTS

DE     102020109742 B4 *   2/2022  ......... G01N 21/4133

* cited by examiner

*Primary Examiner* — David P Porta
*Assistant Examiner* — Fani Polyzos Boosalis
(74) *Attorney, Agent, or Firm* — James D. Welch

(57) ABSTRACT

Methodology of determining absorption and an extinction coefficient of a prism shaped material, including simultaneously for a multiplicity of wavelengths, using an easy to practice technique.

7 Claims, 9 Drawing Sheets

FIG. 15E'''' ized to sample properties of a prism.

METHOD OF DETERMINING ABSORPTION AND EXTINCTION COEFFICIENT OF PRISM SHAPED MATERIAL

TECHNICAL FIELD

The present invention relates to methodology for determining the absorption and extinction coefficients of a material, and more particularly to a method of quickly doing so for a material that has first and second sides which are each planar, but not parallel to one another (eg. a prism shaped sample), and positioned in a system that uses electromagnetic radiation to investigate samples.

BACKGROUND

A Patent to Synowicki et al., U.S. Pat. No. 8,692,985 is disclosed as particularly relevant to the present invention. It, however, does not disclose ellipsometric sensitivity being mostly to surface properties of a prism.

Another Patent to Herzinger et al. U.S. Pat. No. 7,280,194 is disclosed as it describes methodology for determining Refractive Indicies of solid and fluid materials by placing a prism shaped material on a stage in a ($\theta$)-2($\theta$) goniometer system, that rotates about an axis. This geometry makes the method thereof difficult to practice in a typical dual arm ellipsometer or the like system, in which the arms secure a source and a detector respectively, and rotate about, for instance, a horizontally or vertically oriented axis, to enable projecting a beam of electromagnetic radiation onto a sample on a centrally located stage. An alternative approach for arriving at a similar result to that provided by Herzinger et al. 194, using an alternative sample investigation system arrangement is disclosed herein.

In the context of U.S. Pat. No. 8,692,985, a method of determining the refractive index of a prism shaped material in U.S. Pat. No. 7,280,194, can be generally described as comprising the steps of:

a) providing a system comprising:

a1) a stage for supporting said prism shaped material;

a2) a fixed position source of a beam of electromagnetic radiation mounted on an source side of said stage for supporting said prism shaped material, and a detector of a beam of electromagnetic radiation mounted to a support arm on a detector side of said stage for supporting a prism shaped material; the positioning of said source of a beam of electromagnetic radiation defining an input angle of incidence to a source side of a prism shaped material when it is positioned on said stage, such that a beam of electromagnetic radiation from said source can be directed to enter the source side of said prism shaped material, be refracted thereby, pass through said prism shaped material and exit from said detector side of said prism shaped material at a refracted exit angle to said detector side of said prism shaped material, and then proceeds toward and enters said detector of beam of electromagnetic radiation;

a3) a means for rotating the detector side support arm to which said detector is attached, and a means for rotating said stage for supporting said prism shaped material, each through a range of angles.

Said method then further comprises:

b) mounting a prism shaped material to said stage, said prism shaped material having converging source and detector sides that form an apex angle "A" where they intersect;

c) while causing said fixed position source of a beam of electromagnetic radiation to provide a beam of electromagnetic radiation directed toward the source side of said prism shaped material at a fixed angle of incidence to the source side thereof, rotating said stage for supporting said prism shaped material and rotating said support arm on said detector side of said prism shaped material to which said detector is attached to selected positions, and monitoring the intensity of the beam entering said detector as a result.

And finally, d) while monitoring intensity at the detector to enable determining the minimum deviation condition angle, identify the optimum rotation angles of said stage for supporting said prism shaped material and said support arm on said detector side of said prism shaped material to which said detector is attached, repeating step c) for multiplicity of rotations of said stage for supporting said prism shaped material and said support arm on said detector side of said prism shaped material to which said detector is attached until optimum angles of rotations for both the stage for supporting said prism shaped material and support arm on said detector side of said prism shaped material to which said detector is attached where the minimum deviation condition is achieved, (ie. where the intensity is maximum), and identifying the rotation angle of the support arm on said detector side of said prism shaped material to which said detector is attached as the optimum angle;

e) for the optimum angle determined in step d) applying the following formula:

$$n2 = \frac{\sin((A+\theta\min)/2)}{\sin(A/2)} n1$$

to determine n2.

Note, n1 and n2 are the refractive indicies of the ambient environment surrounding said prism shaped material, and of said prism shaped material, respectively.

It is noted that this approach utilizes a sample monitoring system in which, for each degree ($\theta$) a beam of electromagnetic radiation from the source is changed to provide an angle of incidence to the sample, the detector angle is changed (2$\theta$). That is, it utilizes a ($\theta$)-(2$\theta$) goniometer system. When the angle of incidence is ($\theta$), the detector catches the beam at (2$\theta$). This involves the detector arm angle being moved as a slave to the source arm angle and then locked in place. As will be presented later in this specification, each of the source and detector arms to be moved equal amounts in a ($\theta$)-($\theta$) system arrangement, rather than utilize a ($\theta$)-(2$\theta$) system arrangement.

Said method involves investigating a solid prism shaped material, or can have an empty volume in said prism shaped material into which is caused to be present a liquid, the optical constants of which are desired to be determined.

Said method can involves using a source of electromagnetic radiation which is spectroscopic and wherein said method is repeated a plurality of times, for a plurality of wavelengths, to determine refractive index at each thereof.

Said method typically involves application of (O)-(O) means for adjusting each of the source side and detector sides support arms through equal angles, by a mechanism that adjusts each of the source and detector side support arms by automatic simultaneous adjustment.

Continuing, U.S. Pat. No. 10,466,171 is particularly relevant where one wavelength in a beam of electromagnetic radiation is to be investigated at a time, and surface properties of a sample being investigated are of interest. A method disclosed therein provides for determining the refractive index of a prism shaped material, comprising the steps of:
- a) providing a system comprising:
    - a1) a stage for supporting said prism shaped material,
    - a2) a source of a beam of electromagnetic radiation:
        - mounted directly on a rotatable support arm on a source side of said prism shaped material; or
        - mounted other than on a rotatable support arm on a source side of said prism shaped material and also providing a beam directing beam director attached to said support arm on a source side of said prism shaped material.

Positioning a detector of a beam of electromagnetic radiation:
- mounted directly on a separate rotatable support arm on a detector side of said prism shaped material, or
- mounted other than on a rotatable support arm on a detector side of said prism shaped material and also providing a beam directing beam director attached to said rotatable support arm on a detector side of said prism shaped material;

each of said sample and detector side rotatable supports being rotatable about a common axis so as to enable directing a beam of electromagnetic radiation provided by said source of a beam of electromagnetic radiation, at various angles of incidence to said source side of said prism shaped material such that it enters said prism shaped material, is refracted thereby, passes through said prism shaped material and exits from said detector side of said prism shaped material at a refracted exit angle to said detector side of said prism shaped material, and then proceeds toward and enters said detector of beam of electromagnetic radiation.

Said method also comprises providing:
- a3) means for adjusting each of the source side and detector sides rotatable support arms through equal angles by rotation about said common axis; and
- a4) a computer.

The method then continues with:
- b) mounting a prism shaped material to said stage, said prism shaped material having converging source and detector sides that form an apex angle "A" where they intersect;
- c) while causing said source of a beam of electromagnetic radiation to provide a beam of electromagnetic radiation, rotating said rotatable support arm on said source side of said prism shaped material clockwise or counterclockwise some number of degrees to direct a beam of electromagnetic radiation toward the source side of said prism shaped material at an angle of incidence to said source side thereof, and rotating said separate rotatable support arm on said detector side of said prism shaped material counterclockwise or clockwise respectively, to the same magnitude number of degrees as was the rotatable support arm to which the source is attached and monitoring the intensity of the beam entering said detector as a result;
- d) repeating step c) for multiplicity of additional input beam angles of incidence and monitoring the intensity of the beam entering said detector as a result for each said angle to determine the optimum angle of incidence of said electromagnetic beam with respect to said source side of said prism shaped material at which the detector indicates a maximum intensity; and
- e) for the optimum maximum intensity angle of incidence determined in step d), in said computer, applying the following formula;

$$n2 = \frac{(\sin((A + (180 - 2(\theta) \text{ optimum angle}))/2))}{\sin(A/2)} n1$$

to determine n2,
where n1 and n2 are the refractive indicies of the ambient environment surrounding said prism shaped material, and of said prism shaped material, respectively.

The just described method can be characterized by:
- f) said method further comprising adapting the source provided in step a2), or providing a different source of electromagnetic radiation to serve as an ellipsometer system source of a beam of electromagnetic radiation, then causing a beam provided thereby to pass through a polarization state generator, follow a substantially similar path as did the source of a beam of electromagnetic radiation provided in step a2) through said prism material oriented as in step e), pass through a polarization state analyzer and enter the same detector as also provided in step a2), or a different detector of electromagnetic radiation, which same or different detector serves as said ellipsometer system detector, followed by acquiring ellipsometric data from said detector and applying it to characterize surface properties of said prism.

It is to be appreciated that the source of electromagnetic radiation can be spectroscopic and said method can be repeated a plurality of times, for a plurality of wavelengths, to determine refractive index at each thereof.

A U.S. Pat. No. 10,466,171 modified method of simultaneously determining the refractive index of a prism shaped material for a multiplicity of wavelengths, comprises the steps of:
- a) providing a system comprising:
    - a1) a stage for supporting said prism shaped material,
    - a2) a source of a spectroscopic beam of electromagnetic radiation:
        - mounted directly to a rotatable support arm on a source side of said prism shaped material, or
        - mounted other than to said rotatable support arm and provides a spectroscopic beam via a beam director attached to a support arm on a source side of said prism shaped material;
    - and a wavelength disperser and multi-element detector of different wavelengths in a beam of electromagnetic radiation mounted:
        - mounted directly to a separate rotatable support arm on a detector side of said prism shaped material, or
        - mounted other than to said rotatable support arm and directs a spectroscopic beam via a beam director mounted to a support arm on a detector side of said prism shaped material;
    - said source side and detector side rotatable support arms each being rotatable about a common axis so as to enable directing a beam of electromagnetic radiation, provided by said source of a beam of electromagnetic radiation, at various angles of incidence to said source side of said prism shaped material such that it enters said prism shaped material, is refracted thereby, passes through said prism shaped material and exits from said detector side of said prism shaped material at a refracted exit angle to said detector side of said prism shaped material, and then proceeds toward said wavelength disperser where it Is dispersed into separate wavelengths which enter said detector of spectroscopic beam of electromagnetic radiation.

Said method also comprises providing:
- a3) means for adjusting each of the source side and detector sides rotatable support arms through equal angles by rotation about said common axis; and
- a4) a computer.

Said method continues with:
- b) mounting a prism shaped material to said stage, said prism shaped material having converging source and detector sides that form an apex angle "A" where they intersect;
- c) while causing said source of a beam of electromagnetic radiation to produce a spectroscopic beam of electromagnetic radiation, rotating said rotatable support arm on said source side of said prism shaped material counterclockwise or clockwise through a range of angles to direct a beam of electromagnetic radiation toward the source side of said prism shaped material at an angle of incidence to said source side thereof, and rotating said separate rotatable support arm on said detector side of said prism shaped material clockwise or counterclockwise, respectively, through the same range of angles as was the rotatable support arm to which the source is attached, and simultaneously monitoring the intensity of a multiplicity of dispersed wavelengths in said beam entering different detecting elements of said detector as a result;
- d) monitoring the intensity of each of said multiplicity of dispersed wavelengths in the beam entering the multiple elements of said detector as a result by so doing determining the optimum angle of incidence of each wavelength in said electromagnetic beam with respect to said source side of said prism shaped material at which the detector indicates a maximum intensity; and
- e) for the optimum maximum intensity angle of incidence determined in step d), in said computer, applying the following formula:

$$n2 = \frac{(\sin((A + (180 - 2(\theta) \text{ optimum angle}))/2))}{\sin(A/2)} n1$$

to determine n2,
where n1 and n2 are the refractive indicies of the ambient environment surrounding said prism shaped material, and of said prism shaped material, respectively, where n2 is wavelength dependent.

Said method is characterized by:
- f) said method further comprising adapting the source provided in step a2), or providing a different source of electromagnetic radiation to serve as an ellipsometer system source of a beam of electromagnetic radiation, then causing a beam provided thereby to pass through a polarization state generator, follow a substantially similar path as did the source of a beam of electromagnetic radiation provided in step a2) through said prism material oriented as in step e), pass through a polarization state analyzer and enter the same detector as also provided in step a2), or a different detector of electromagnetic radiation, which same or different detector serves as said ellipsometer system detector, followed by acquiring ellipsometric data from said detector and applying it to characterize surface properties of said prism.

In both method embodiments the source of said, for instance, spectroscopic beam of electromagnetic radiation can be directly attached to the said rotatable support arm on said source side of said prism shaped material, and the beam diffractor and detector of electromagnetic radiation exiting said prism shaped material can be directly attached to said rotatable support arm on said detector side of said prism shaped material.

In both method embodiments the source of said spectroscopic beam of electromagnetic radiation can provide a beam that is directed to the prism shaped material by a beam director that is attached to the said support arm on said source side of said prism shaped material, and/or the beam of electromagnetic radiation exiting said prism shaped material can be directed to the beam diffractor and detector by a beam director that is attached to said support arm on said detector side of said prism shaped material.

In both method embodiments the step of providing said means for adjusting each of the source side and detector sides support arms through equal angles, can involve providing a mechanism that adjusts each of the source and detector side rotatable support arms independently.

In both method embodiments the step of providing said means for adjusting each of the source side and detector sides rotatable support arms through equal angles, can involve providing a theta (θ)-theta (θ) mechanism wherein adjusting the source side rotatable support arm, automatically results in said detector side rotatable support arm being adjusted.

In both method embodiments the prism shaped material can have an empty volume therein and into which is caused to be present a liquid, the optical constants of which are to be determined.

In both method embodiments said method can further comprise determining the extinction coefficient of said prism shaped material, by:
- g) changing the position of said stage so that the electromagnetic beam passing therethrough passes through a different length of said prism shaped material, and monitoring the output of said detector of a beam of electromagnetic radiation to provide the intensity exiting said prism shaped material; and
- h) applying said intensity value obtained in step g, and the intensity value previously obtained in step c, and relating them to path lengths of said beam as it passes through said prism shaped material, to determine the extinction coefficient.

Note: Practice of steps g) and h) will typically involve changing of position of the stage by moving it, for instance, up or down where the stage is oriented horizontally. This will cause the beam to transverse a different length of prism shaped material as it passes therethrough.

In both method embodiments the common axis about which the rotatable source side support and detector side support arms rotate can be oriented substantially horizontally, or substantially vertically in lab coordinates.

In both embodiments the prism shaped material can be of a known refractive index, and its measured value used to calibrate the system so that it reads accurately as well as repeatable.

In both method embodiments, the steps can be carried out under control of a computer and/or the method can include storing at least some output provided by the detector in non-transitory machine readable media, and analyzing at least some output provided by the detector.

In both method embodiments, it is noted that the stage for supporting said prism shaped material need not be rotatable, as is required in (θ)-(2θ)) system described in that Background Section of this Specification, but it is able to be moved, for instance, up and down where the stage is mounted horizontally, in laboratory coordinates. In fact, the stage can be fixed in place as regards rotation.

In both just described method embodiments said means for adjusting each of the source side and detector sides rotatable support arms through equal angles, can involve providing a mechanism that adjusts each of the source and detector side rotatable support arms independently, or involves providing a theta (θ)-theta (θ) mechanism wherein adjusting the source side rotatable support arm automatically results in said detector side rotatable support arm being adjusted.

Also, in both just described method embodiments, where a prism shaped material is of a known refractive index its measured value can be used to calibrate the system so that it reads accurately, as well as repeatably. This would involve adjusting measurement system parameters so that the measured reading is what is expected for said known sample.

Further, in both method embodiments the source of a spectroscopic beam of electromagnetic radiation can be directly attached to the said rotatable support arm on said source side of said prism shaped material, and the beam diffractor and detector of electromagnetic radiation exiting said prism shaped material can be directly attached to said rotatable support arm on said detector side of said prism shaped material, or beam directors can be attached to the source and detector side arms and the actual source and detector of electromagnetic radiation be located at another location.

It is noted that in all discussion, where (θ)-(θ) configurations are mentioned, a (θ)-(2θ) system can be applied, and vice-versa.

Even in view of the foregoing, need remains for an easy to practice method of determining extinction coefficients of a prism shaped material. This is especially the case when a spectroscopic beam of electromagnetic radiation is used and extinction coefficients are to be quickly determined for a multiplicity of wavelengths in a single sweep of a beam with respect to prism shaped material.

DISCLOSURE OF THE INVENTION

The present invention, as applied to Prism shaped samples includes three approaches for determining Absorption and Extinction Coefficients. Two of said approaches require determining refractive indicies at a Minimum Deviation condition and from said Refractive Indicies determining Absorption over one or two pathlengths that a beam follows in said Prism at said Minimum Deviation condition. One approach involves determining Intensity at a Detector for two such Beam pathlengths in said Prism Shaped Sample and was disclosed in U.S. Pat. No. 10,466,171. The second such approach involves determining "Excess Beam Intensity Attenuation" as determined from monitoring Intensity of a beam which exits the Prism in from a single pathway. "Excess Beam Intensity Attenuation" is defined as that not accounted for by determining and applying Fresnel Coefficients for the Angle of Incidence the Beam makes with respect to said Prism Shaped Sample. This approach calculates how much Intensity Attenuation is expected based on Reflections and Transmissions of the Beam at Interfaces between the Sample and the Ambient. The Excess Beam Intensity Attenuation is then attributed to the effect of Prism Material over said single pathlength the Beam transversed, (eg. the absorption of Beam Intensity by said sample material). In prior art methodology, it is required to achieve a Minimum Deviation Condition, then find Absorption over two different pathlengths and attribute the difference in Absorptions to the affect of the difference in Beam Path lengths. The second and newly disclosed herein method requires only One Pathlength but requires calculating expected Beam Intensity Attenuation and measuring Actual Beam Intensity Attenuation measured and attributing additional loss in Intensity over said single pathlength to absorption by the Sample Material. Both the first two approaches require determining Beam Pathlength(s) the Beam transverses. Again, the Second thereof is newly disclosed herein. A third approach, also newly disclosed herein, involves simply obtaining multiple Intensity values of a Beam exiting the Prism at a Detector, each corresponding to a different Beam Path length, and performing a Regression onto an Exponential Equation using at least three Intensity points. Note that in this approach there is no need to know any specific Pathlength. It should be appreciated that where other than a true Prism shape Sample is involved, such as a Wedge shaped basically flat Sample, the third approach is applicable.

The first approach alluded to above is covered well in U.S. Patent to Sinowicki et al. U.S. Pat. No. 10,466,171 and is not specifically further described herein.

The Second approach alluded to above is a method of determining the refractive index and absorption coefficient of a prism shaped material at a given wavelength, comprising the steps of:
a) providing a system comprising:
  a1) a stage for supporting said prism shaped material,
  a2) a source of a beam of electromagnetic radiation:
    mounted directly on a rotatable support arm on a source side of said prism shaped material; or
    mounted other than on a rotatable support arm on a source side of said prism shaped material and also providing a beam directing beam director attached to said support arm on a source side of said prism shaped material;
  and positioning a detector of a beam of electromagnetic radiation:
    mounted directly on a separate rotatable support arm on a detector side of said prism shaped material, or
    mounted other than on a rotatable support arm on a detector side of said prism shaped material and also providing a beam directing beam director attached to said rotatable support arm on a detector side of said prism shaped material;
  each of said sample and detector side rotatable supports being rotatable about a common axis so as to enable directing a beam of electromagnetic radiation provided by said source of a beam of electromagnetic radiation, at various angles of incidence to said source side of said prism shaped material such that it enters said prism shaped material, is refracted thereby, passes through said prism shaped material and exits from said detector side of said prism shaped material at a refracted exit angle to said detector side of said prism shaped material, and then proceeds toward and enters said detector of beam of electromagnetic radiation;

a3) means for adjusting each of the source side and detector sides rotatable support arms through equal angles by rotation about said common axis; and a4) a computer.

The Method continues with:

b) mounting a prism shaped material to said stage, said prism shaped material having converging source and detector sides that form an apex angle "A" where they intersect;

c) while causing said source of a beam of electromagnetic radiation to provide a beam of electromagnetic radiation, rotating said rotatable support arm on said source side of said prism shaped material clockwise or counterclockwise some number of degrees to direct a beam of electromagnetic radiation toward the source side of said prism shaped material at an angle of incidence to said source side thereof, and rotating said separate rotatable support arm on said detector side of said prism shaped material counterclockwise or clockwise respectively, to the same magnitude number of degrees as was the rotatable support arm to which the source is attached and monitoring the intensity of the beam entering said detector as a result;

d) repeating step c) for multiplicity of additional input beam angles of incidence and monitoring the intensity of the beam entering said detector as a result for each said angle to determine the optimum angle of incidence of said electromagnetic beam with respect to said source side of said prism shaped material at which the detector indicates a maximum intensity; and e) for the optimum maximum intensity angle of incidence determined in step d), in said computer, applying the following formula:

$$n2 = \frac{(\sin((A + (180 - 2(\theta) \text{ optimum angle}))/2))}{\sin(A/2)} n1$$

to determine n2, where n1 and n2 are the refractive indicies of the ambient environment surrounding said prism shaped material, and of said prism shaped material, respectively;

f) determining the path length that said beam follows in said prism;

g) from the refractive indicies, determining the Fresnel Coefficients and therefrom calculating the expected diminishment in intensity expected as a result of reflections at interfaces between said prism shape sample and an ambient there-surrounding;

h) comparing said expected intensity decrease to that measured at said detector;

i) attributing any excess decrease of intensity to absorption in said prism over the length of the beam path therein; and j) having the excess absorption from step i) and path length of the beam in said prism from step f), determining the absorption coefficient "a", from:

$I=I0 \exp(-az)$, and the extinction coefficient "k" from:

$a=(4 Pi k)/\lambda$, where I0 is an initial beam intensity, $\lambda$ is wavelength, and k is the extinction coefficient;

onto said data set to the end that the absorption and extinction coefficients are determined.

Continuing, the Third approach alluded to above provides for determining Absorption and Extinction Coefficients for materials which comprise two sides, both of which are can be in a Prism, or can be substantially planar, but which first and second sides are not oriented parallel to one another. This property is especially represented by Prism shaped systems, and less obviously by Substrates which present with a polished First Side, and a Second Side offset therefrom which is not parallel thereto. In either example moving the location at which a Beam of Electromagnetic Radiation enters thereinto along a length of said sample can result in the effective thickness of said sample increasing or decreasing if the path is chosen properly so as not to include one wherein the thickness remains the same. Ideally the path of a Beam entering said Sample can be perpendicular to the surface entered. (Where a Prism shaped Sample is present a Beam can enter along a path which is a bisector of an angle between the sides of entry and exit of said beam).

A present invention method of quickly determining absorption and extinction coefficient of a sample having a front and a back side, said front and back sides being substantially planar but are not parallel to one another, said method comprising the steps of:

a) providing a sample having a front and a back side, said front and back sides each being substantially planar but are not parallel to one another;

b) providing:
a source of a beam of electromagnetic radiation that comprises at least one wavelength which is subjected to absorption in said sample when caused to enter and pass therethrough; and
a detector of electromagnetic radiation which is sensitive to at least one wavelength provided said source thereof.

Said method continuing with:

c) positioning said sample and said source of a beam of electromagnetic radiation such that in use a beam of electromagnetic radiation from said source thereof is caused to enter the front side thereof, pass therethrough, exit the back side thereof, and enter said detector;

d) while causing the location at which said beam enters said sample to move along a path transversing the front side of said sample by moving said beam and/or said sample such that electromagnetic radiation entering said detector continually increases, or continually decreases as said path is traversed, obtaining a data set relating beam intensity vs. beam position on said sample along said path; and e) conducting a mathematical regression of an equation:

$I=I0 \exp(-az)$, where absorption coefficient $a=(4Pi k)/\lambda$,

I0 is an initial beam intensity,
$\lambda$ is wavelength, and
k is the extinction coefficient;

In general, said methodology, as appropriate, can involve that:

the sample is of a distinct prism shape or is a substrate in which said front and back sides are not parallel to one another;

the beam of electromagnetic radiation at least one wavelength is partially absorbed by passing through said sample;

said beam of electromagnetic radiation is not perfectly collimated at the location on said sample first side at which it enters said sample; and said beam of electromagnetic radiation does not enter said front side of said sample at an exact perpendicular angle thereto.

It should be appreciated that the Present Invention can provide a value for absorption and extinction coefficients of a sample material by a less complicated set of steps than required in the Methodology of U.S. Pat. No. 10,446,171 as presented in the Background Section herein. The present invention, in part, relies on taking a data set that is comprised of a plurality of Intensities that correspond to differing amounts of electromagnetic radiation absorption as a function of how much sample material the beam passes through, before exiting said sample and entering said detector. A plot of said Intensities vs. position shows exponential change, and mathematical regression of an Exponential equation thereonto provides a value for the desired Absorption and Extinction Coefficients. It is also noted that precise orientation of a Beam is not critical for the purposes of the present invention as all data points are taken similarly. The major influence on Intensity is therefore due to the length of the absorbing material the beam passes through.

Said methodology can provide that the beam of electromagnetic radiation is spectroscopic and intensity data be accumulated in step d) for a plurality of wavelengths simultaneously, and wherein in step e) regressions are performed for at least two of said plurality of wavelengths to provide extinction coefficients for each said wavelength. In that light it is noted that where the beam of electromagnetic radiation is spectroscopic, the Intensity for each wavelength will vary as the location at which said beam enters said sample is caused to move along a path transversing the front side of said sample. At at least three locations the Intensities for at least some of the wavelengths can be determined and one can then envision plotting said Intensities for each selected wavelength and noting that an exponential curve can be fitted thereto by a regression procedure. In practice it can occur that the beam can move too far though, and "fall off", that is not enter said surface of said sample. Where this, or some other effect provides an Intensity value which obviously does not sit along said envisioned exponential plot, it should be ignored in the context of the present methodology and not included in a regression.

It is noted that when ample is a semiconductor and the beam energy is below the bandgap thereof.

Further, the beam of electromagnetic radiation is spectroscopic and intensity data is accumulated in step d) for a plurality of wavelengths simultaneously, and wherein in step e) regressions are performed for at least two of said plurality of wavelengths to provide absorption and extinction coefficients for each said wavelength.

A more straight forward recitation of a Present Invention method of determining absorption and extinction coefficients for a prism shaped sample comprises the steps of:
 a) causing a source of a beam of electromagnetic radiation to direct a beam of electromagnetic radiation toward a prism shaped sample having first and second faces, at an angle to the first face thereof which meets the minimum deviation criteria;
 b) detecting said beam of electromagnetic radiation after it exist said prism shaped sample as an output beam after passing through a pathlength therein;
 c) performing step d) or step e):
 d) determine intensities for said output beam for at least three different pathlengths through said prism shaped sample and doing a regression thereof onto:

$$I = I0 \, \exp(-az),$$

and the extinction coefficient "k" from:
 $a = (4\,\text{Pi}\,k)/\lambda$, where I0 is an initial beam intensity, $\lambda$ is wavelength, and k is the extinction coefficient;
to determine absorption a) and extinction k) coefficients;
 e) subtracting expected reduction of intensity of said input beam resulting from reflections at interfaces between said prism shaped sample and an ambient there-surrounding, measuring the output intensity of said output beam (OB), and attributing any excess loss of intensity at said detector, over that calculated based on said reflections, and in combination with a measured path length of said beam of electromagnetic radiation through said prism shaped sample determining said absorption a) and extinction k) coefficients.
through said prism shaped sample, determining said absorption a) and extinction k) coefficients as defined by;

$$I = I0 \, \exp(-az),$$

and the extinction coefficient "k" from;
 $a = (4\,\text{Pi}\,k)/\lambda$, where I0 is an initial beam intensity, $\lambda$ is wavelength, and k is the extinction coefficient.

It is noted that reflections (R1) and (R2) can be calculated from well known Fresnel Coefficients.

Finally, in passing it is noted that the Extinction Coefficients are determined from the Absorption values regardless of how the former are determined.

The invention will be better understood by reference to the Detailed Description Section of this Specification, and the accompanying Drawings.

DETAILED DESCRIPTION

FIGS. 1-12 are from U.S. Pat. No. 10,455,171 and are reproduced here to provide contrast to the Present Invention. Turning now to the Drawings, FIGS. 1 and 2 duplicate FIGS. 1 and 2 in the Herzinger 194 Patent. The Stage (FS) is oriented so that its sample supporting surface (FS) faces upward, and so that it can be rotated about a vertical axis, and the Source (LS) of electromagnetic radiation, and Detector (DET) thereof move in a demonstrative horizontally oriented plane. This works well, but is not consistent with the geometry of many typical ellipsometer and other systems that comprise a Theta ($\theta$)-Theta ($\theta$) goniometer.

Figure 1:
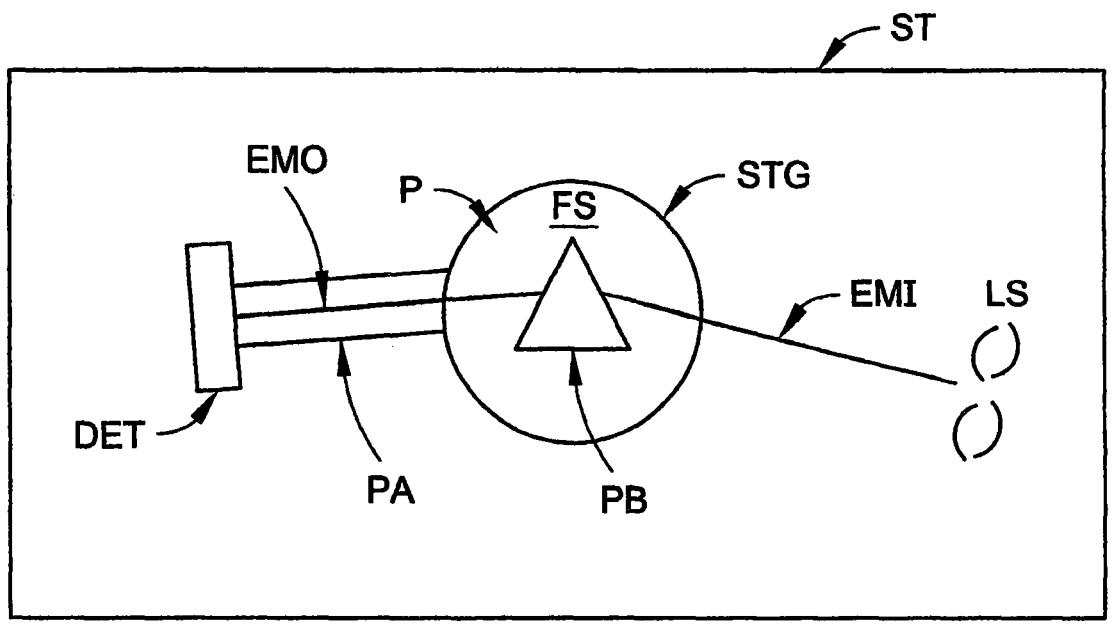
FIGS. 1 and 2 are FIGS. 1 and 2 in Herzinger U.S. Pat. No. 7,280,194.
Figure 2:
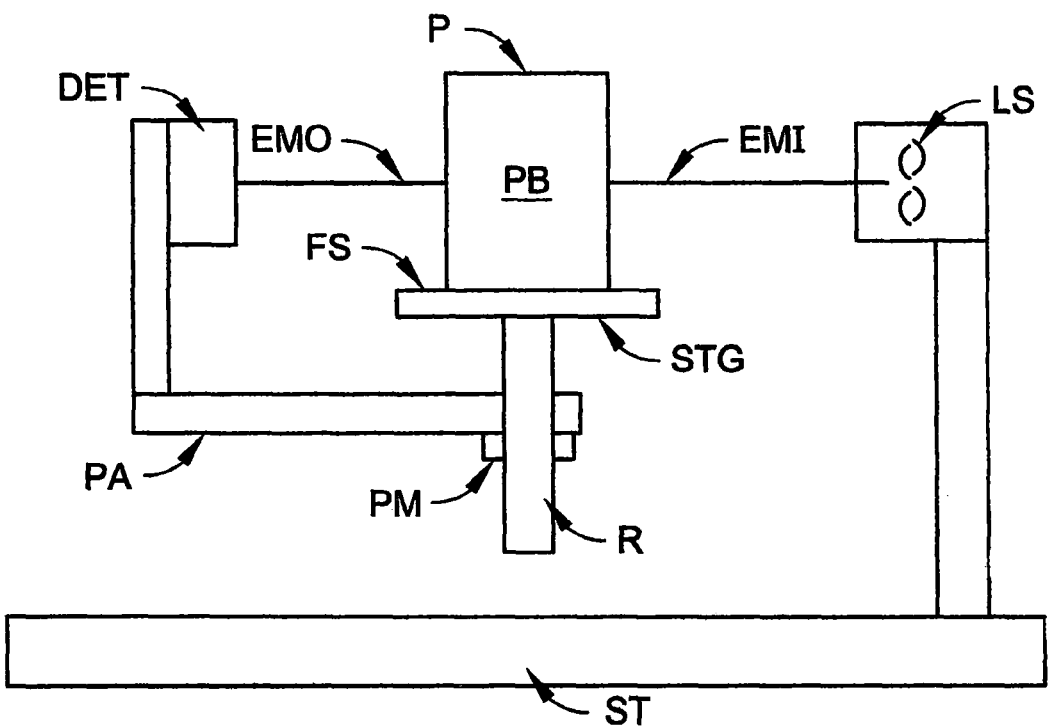
Figure 3:
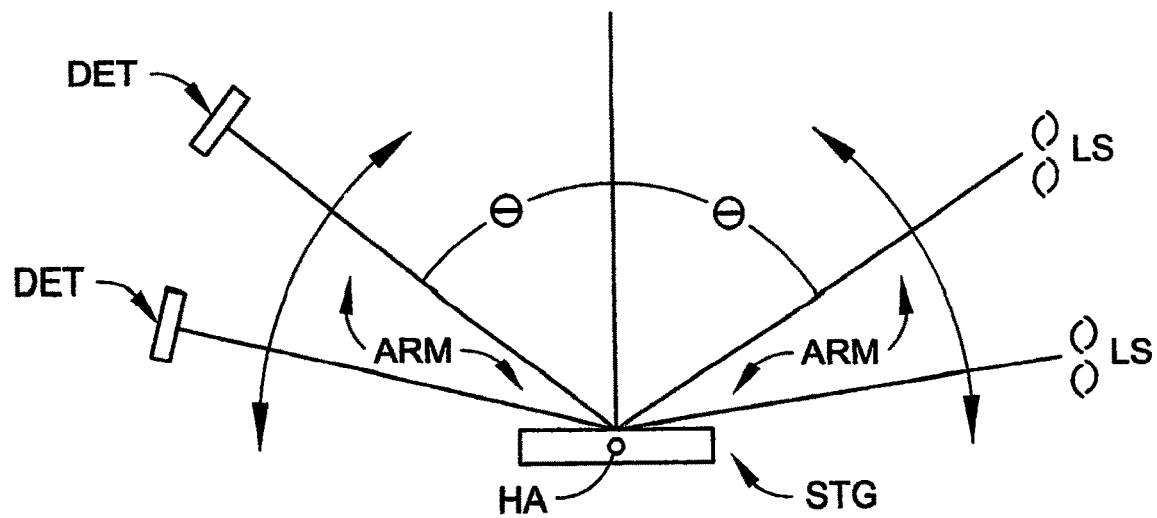
FIG. 3 shows a typical ellipsometer system configuration with source and detector rotatable arms mounted in a ($\theta$)-($\theta$) configuration.

FIG. 3 shows a more typical goniometer system configuration in an ellipsometer or other sample investigation system that utilizes electromagnetic beams. Note that the sample supporting Stage (STG) surface (FS) is shown facing upward for demonstrative purposes, and also that the Source (LS) of electromagnetic radiation and Detector (DET) thereof move in a vertically oriented plane in what can be termed a rotational motion that controls the angles ($\theta$) of incidence of the electromagnetic radiation input beam (EMI) from said Source (LS) onto said Stage (STG) and its reflection angle toward the Detector (DET). Said Source (LS) and Detector (DET) are shown mounted to Arms (ARM) to enable said motion. It is noted that as shown, the stage (STG) can be provided the capability of moving up and down, and such capability is applied in the present invention to enable determination of prism material absorption and extinction coefficient. Further, it is to be understood that the system could be arranged to allow stage (STG) rotations about a demonstrative horizontal axis, rather than a vertically oriented axis, but this capability is generally not utilized in the present invention methodology where the stage rotationally fixed. The FIG. 3 configuration is consistent with many conventional ellipsometer, and other systems that utilize electromagnetic beams to investigate samples, such as those manufactured by the J.A. Woollam CO. In use the Stage (STG) can be fixed in position and the Arms (ARM) rotated in a demonstrative vertically oriented plane about a demonstrative horizontally oriented axis, or the Source (LS) can be fixed in position and the Arm (ARM) to which the Detector (DET) is attached, and the Stage (STG) rotated about demonstrative horizontally oriented axes. FIG. 3 demonstrates a ($\theta$)-($\theta$) goniometer scenario. FIG. 3 is be interpreted as demonstrating any means; manual, motorized etc. for moving said arms (ARM) on both Source (LS) and Detector (DET) sides, and vertically.

Figure 4:
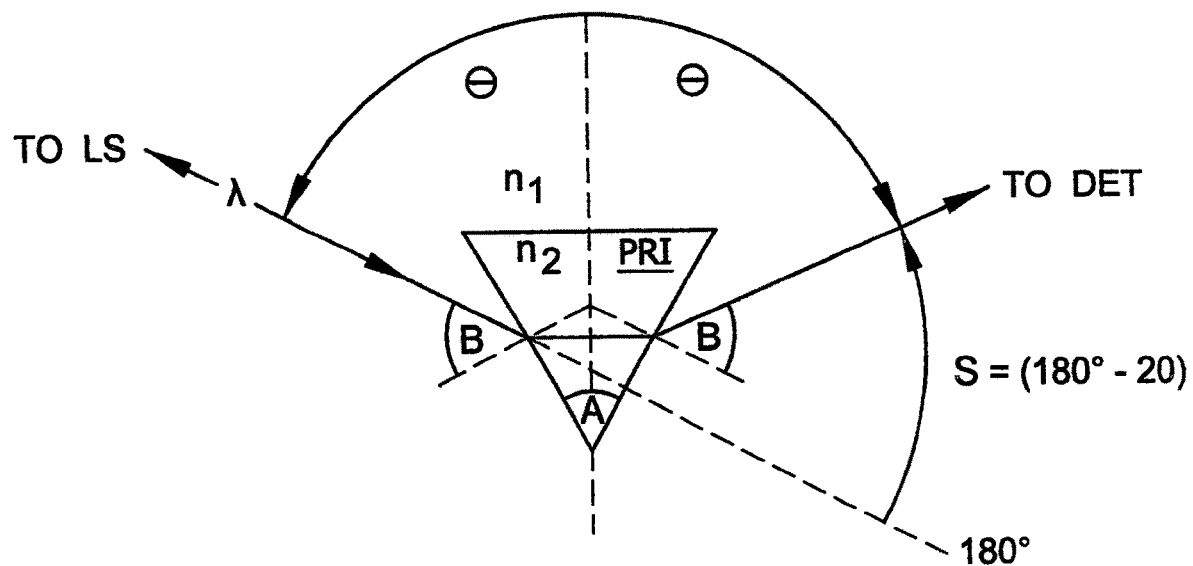
FIG. 4 shows that where a Prism Shaped Material (PRI) is placed on a stage (STG) the ($\theta$)-($\theta$) goniometer scenario is altered in that the Theta ($\theta$) angles of incidence and exit are changed by said Prism Shaped Material (PRI).

FIG. 4 shows that where a Prism Shaped Material (PRI) is placed on a stage (STG) the ($\theta$)-($\theta$) goniometer scenario is altered in that the Theta ($\theta$) angles of incidence and reflection are changed by said Prism Shaped Material (PRI). However, where the angles ($\theta$) are made to be equal by rotation of the Source (LS) and Detector locations in a vertically oriented plane, what is termed the "Minimum Deviation" condition is achieved. At that condition FIG. 4 indicates that the Refractive Index ($n_2$ can be calculated.

Figure 5:
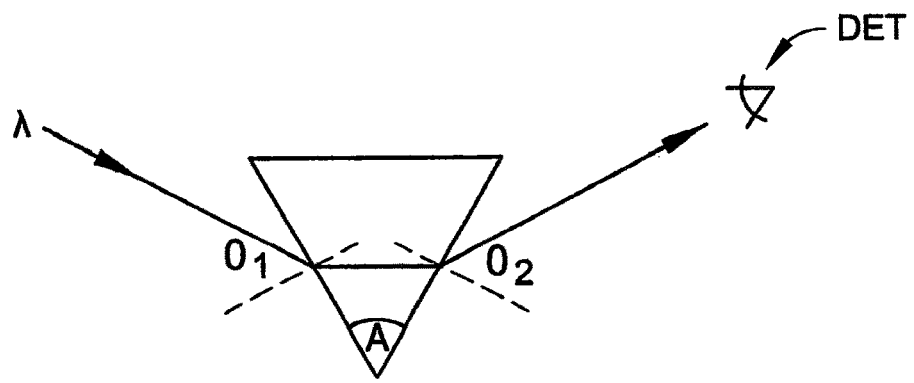
FIGS. 5 & 6 indicates a traditional ($\theta$)-2($\theta$) goniometer configuration that can be applied to determine the refractive index utilizing a Stage (STG) and a Detector (DET) that can each be rotated. Note, (A) and ($\theta$) angles are measured in degrees.
Figure 6:
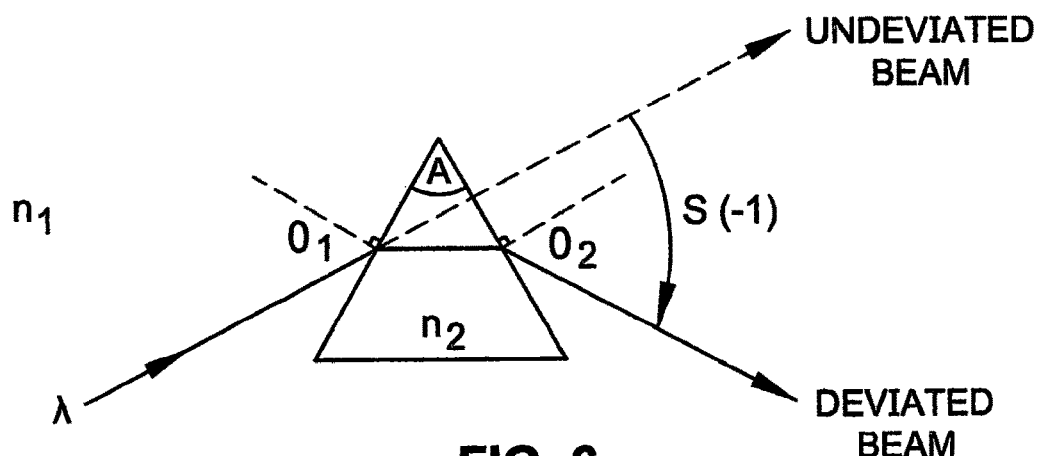

FIGS. 5 and 6 indicate a traditional (O)-2(O) approach to achieving a similar result wherein the Stage (STG) and Detector (DET) are rotated in a Vertically oriented plane. FIGS. 1, 2, 5 and 6 are included to provide contrast to the ($\theta$)-($\theta$) system utilized in the present invention methodology, insight to which is provided in FIGS. 3, 4 and 7.

Figure 7:
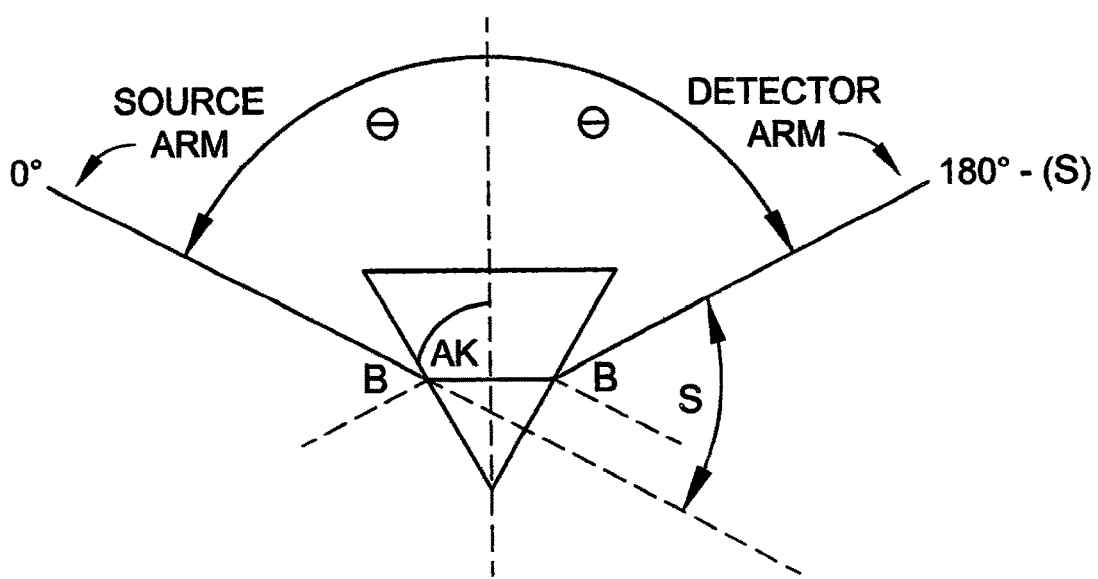
FIG. 7 shows a goniometer system for practicing the present invention Minimum Deviation ($\theta$)-($\theta$) method that enables an intensity measurement approach to determining the Refractive Index of a Prism Shaped Material.

FIG. 7 shows a Prism Shaped Material mounted in a FIG. 3 type (O)-(O) system which it is applied in a present invention method of determining the Refractive Index thereof.

Figure 8A:
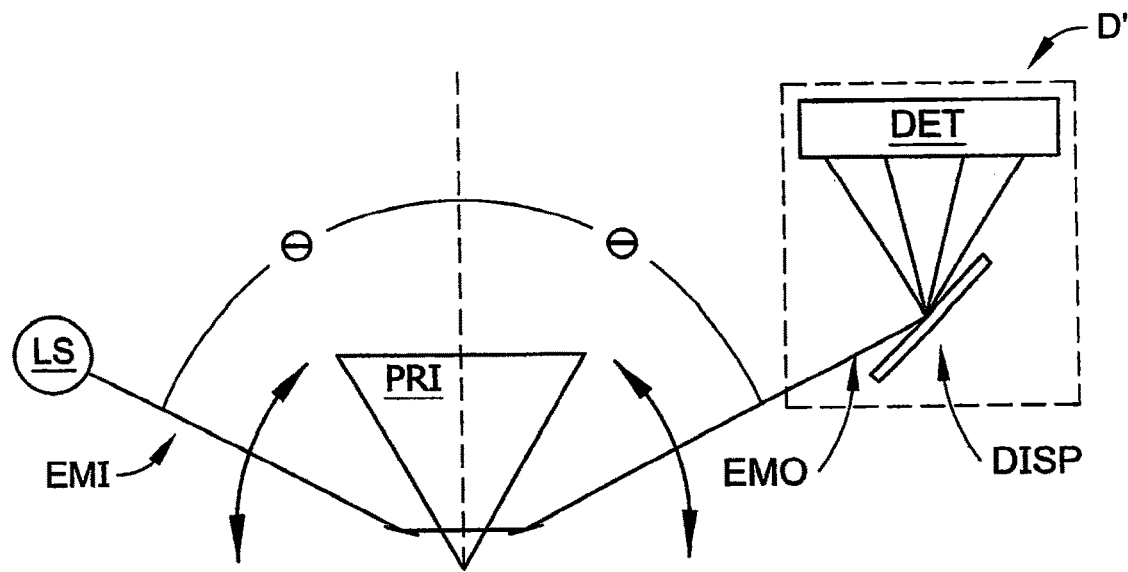
FIGS. 8A and 8B show a system for practicing a very beneficial simultaneous multiple wavelength method of the present invention.
Figure 8B:
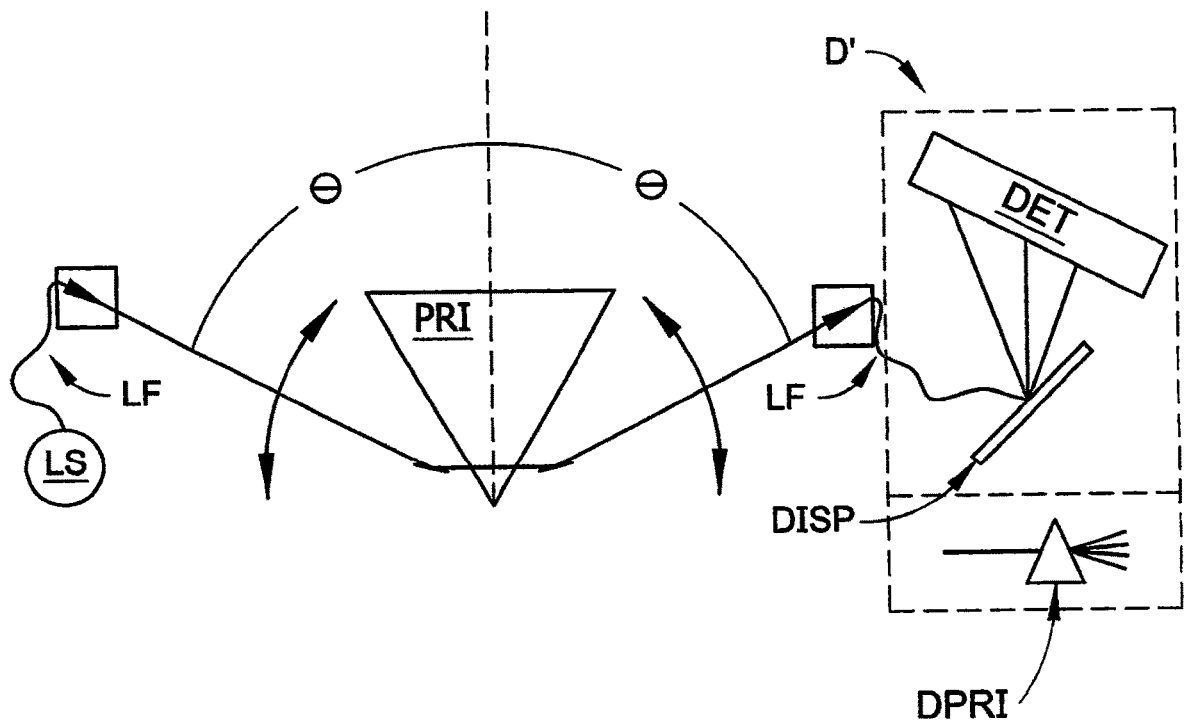
Figure 9:
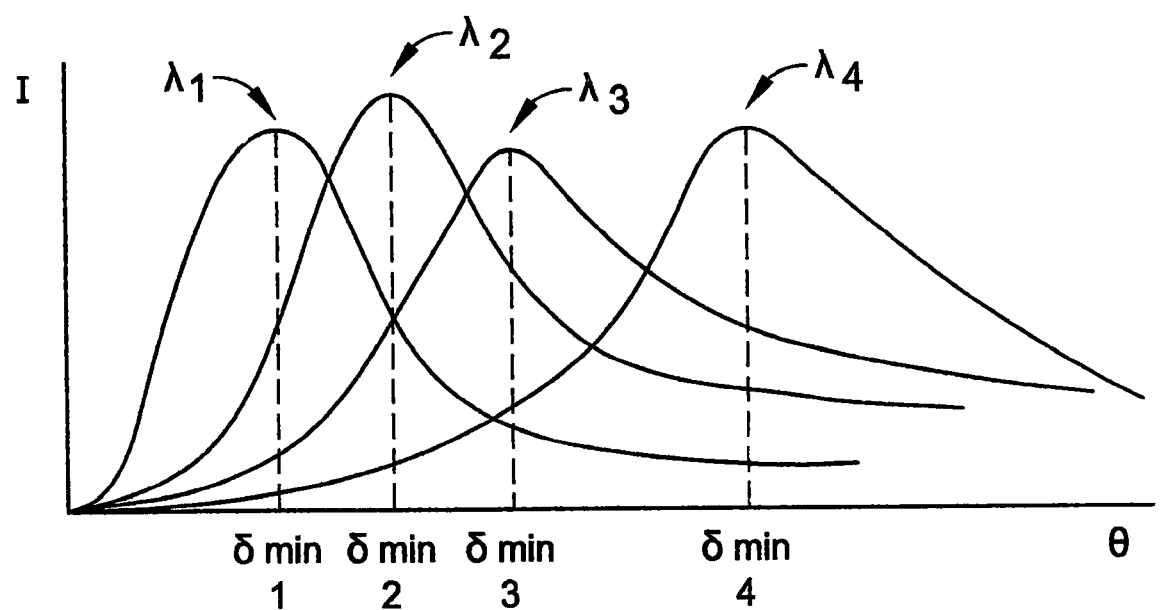
FIG. 9 plot is developed either actually or in a computer memory for multiple wavelengths.

FIGS. 8A and 8B show a system for practicing a very beneficial method of the present invention. Shown are a source (LS) of a spectroscopic beam of electromagnetic radiation, a Prism shaped material, a Disperser (DISP) and a Detector (DET) that form a unite (D'). In use (LS) and (D'), and therefore the beams (EMI) and (EMO) are scanned through equal Theta (O) angles, but one clockwise and the other counterclockwise, while a FIG. 9 plot is developed either actually or in a computer memory. Note that for each wavelength: a different minimum deviation peak intensity is identified. That is, in one scan through a range of Theta ($\theta$) angles can provide Refractive Indicies for a multiplicity of wavelengths. This is much faster than is typically possible in traditional known approaches and, again, utilizes a ($\theta$)-($\theta$) goniometer system. The speed of data acquisition is a very important aspect enabled by of the present invention methodology. Also indicated is indication that a wavelength dispersing element can be a grating (DISP) or prism (DPRI). However, any wavelength dispersing element, (eg. a prism), can be used that directs different wavelengths into different detector elements.

It is noted that FIGS. 8A and 8B should be interpreted to allow a beam director, (eg. an optical fiber (LF)) to be present at only a source or detector side, or on both source and detector sides, or on neither side as demonstrated in FIG. 3.

FIG. 9 shows a plot can be developed, either actually or in a computer memory, for multiple wavelengths.

Figure 10:
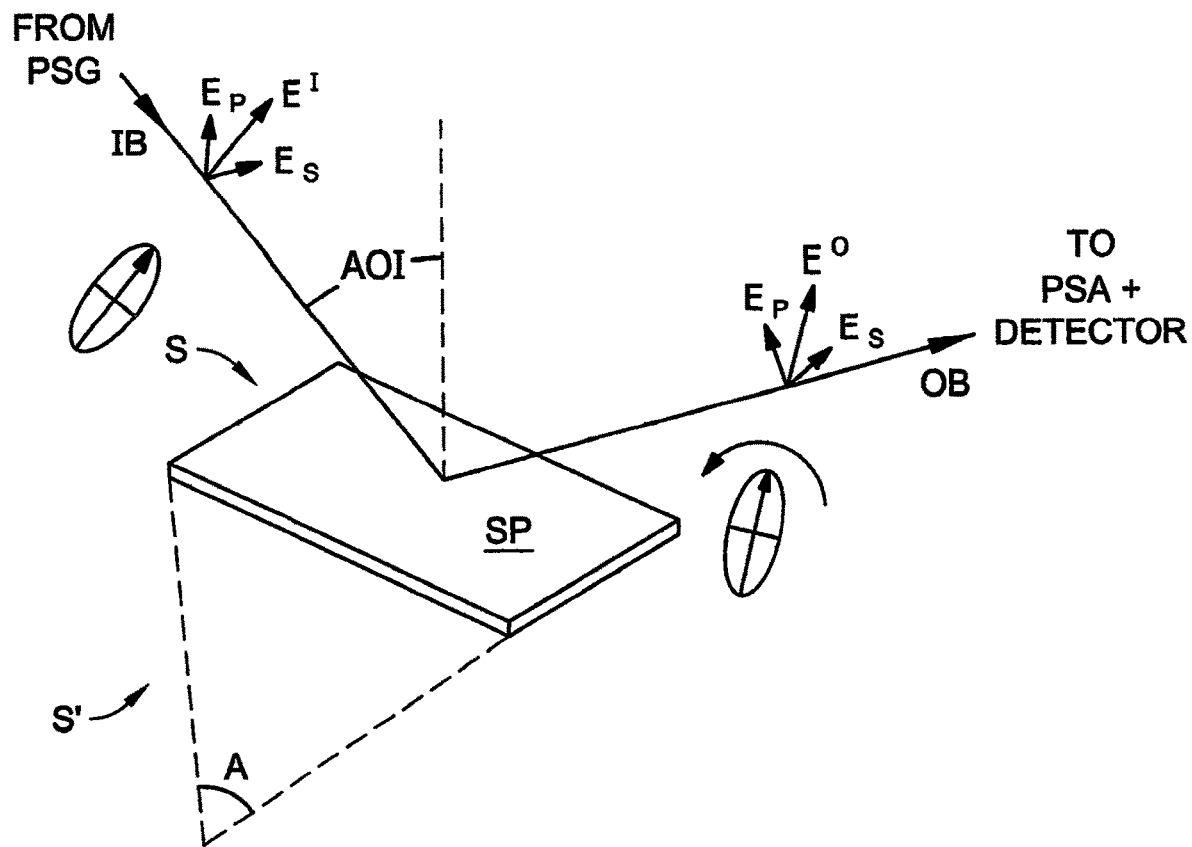
FIG. 10 shows a typical reflection mode application of ellipsometry to investigate a sample surface.

FIG. 10 shows a typical prior art reflection mode application of ellipsometry to investigate a sample surface properties (SP). (Shown in dashed lines is indication that the surface properties (SP) investigated can be on a surface of a prism). Note that a polarized beam (IB) from a polarization state generator (PSG) is directed an Angle-of-Incidence (AOI) the surface of the sample (S), and reflects as output beam (OB) which is directed toward a polarization state analyzer (PSA) and detector (DET). Note that polarization state ellipses are indicated for the input beam (IB) and output beam (OB). Importantly, note that the ellipse associated with the output beam (OB) is rotated, and the degree of ellipticity can be changed by interaction with the sample (S), as compared to that indicated for the input beam (OB). This is at least partially the result of interaction with sample (S) surface properties (SP).

Figure 11:
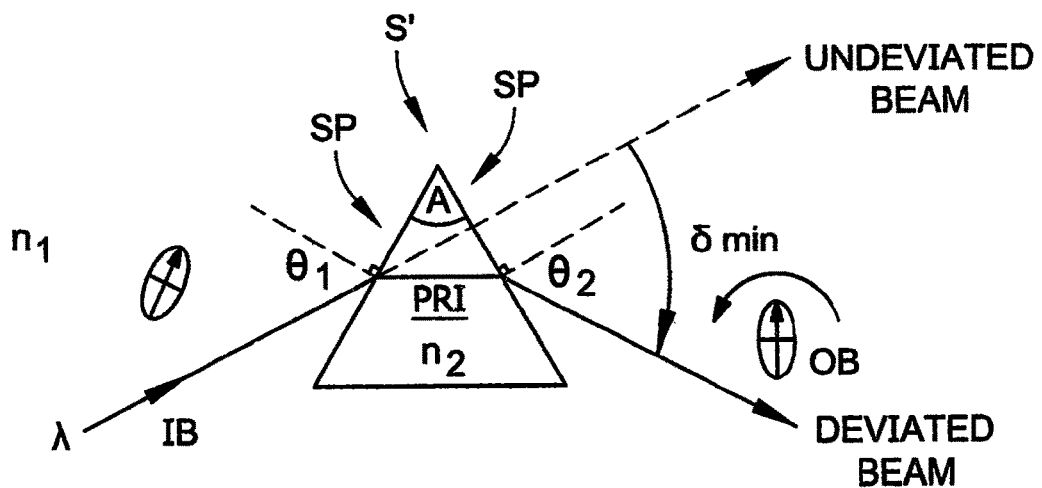
FIG. 11 is FIG. 6 drawn to further include indication of surface properties on sides thereof into which a beam enters and exits.

FIG. 11 is FIG. 6 herein, redrawn to further include indication of surface properties (SP) on sides thereof into which an input beam (IB) enters and an output beam (OB) exits. It is to be understood that when the minimum deviation condition is met by properly orienting the FIG. 11 prism (PRI) with respect to the input beam (IB), the situation of FIG. 11 is mathematically similar to that in FIG. 10, in the sense that a change in polarization state of the output beam (OB) as compared to that of the input beam (IB) provides information about the properties of surface(s) of the prism (PRI) on sides thereof where the input beam (IB) enters thereinto, and output beam (OB) exists therefrom. It is the focus of the present invention to allow not only determining bulk the refractive index, absorption and extinction coefficient by a minimum deviation procedure, as described elsewhere in this Specification, but to also determine surface properties (SP) of a prism (S') without the necessity of practicing a FIG. 10 scenario. It should be especially appreciated that unpolarized electromagnetic radiation is generally used to determine the refractive index and extinction coefficient by the minimum deviation procedure. This is because said unpolarized electromagnetic radiation is not sensitive to the indicated surface properties (SP). This is not to say, however, that a polarized beam could not be used in achieving a minimum deviation condition. In fact, it is known to use "p" and/or "s" polarized electromagnetic radiation in a minimum deviation scenario, when a prism shaped sample is known to be birefringent. However, once the Minimum Deviation condition is met using the unpolarized, (or polarized), electromagnetic radiation, proceeding to then apply Polarized electromagnetic radiation, without re-orienting the Prism (PRI) to a FIG. 10 configuration, enables much more convenient investigation of prism surface properties (SP). It should be especially appreciated that Prior Art procedure has required removing the prism (PRI) from the FIG. 11 system required to achieve the Minimum Deviation condition, (and thereat allow determination of the refractive index and extinction coefficient), and then re-configuring the prism (PRI) as shown in FIG. 10 to determine surface properties thereof, at surface(s) thereof whereat the beam of electromagnetic radiation interacts therewith. And, this might include doing so for both surfaces of the prism in the FIG. 10 system. The present invention then, allows determination of not only refractive index and extinction coefficient of a bulk Prism (PRI) shaped material using unpolarized electromagnetic radiation, but quickly, without reconfiguring the prism (PRI) as shown in FIG. 10, determine surface properties thereof by using polarized electromagnetic radiation. (That is, a FIG. 10 scenario is achieved in FIG. 11, as indicated in FIG. 10 with dashed lines. It is noted that two surfaces are included in the FIG. 11 scenario, as opposed to only one in a FIG. 10 scenario, however, this serves only to increase the sensitivity of a polarized beam to said surface properties). The convenience afforded by the present invention procedure provides utility to practitioners.

It is noted in general that surface properties can include coatings and/or roughness etc.

Figure 12:
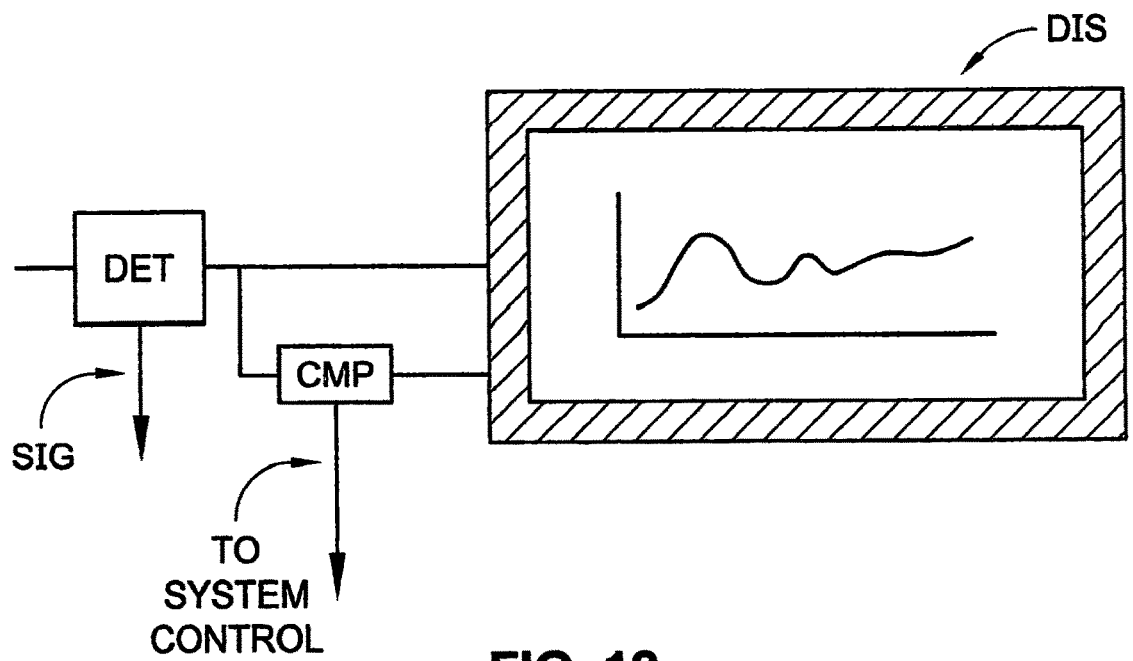
FIG. 12 is included to show a detector of an output beam (OB) can include a computer (CM) and Display (DIS).

FIG. 12 is included to show a detector of an output beam (OB) can include a computer (CM) and Display (DIS).

Figure 13:
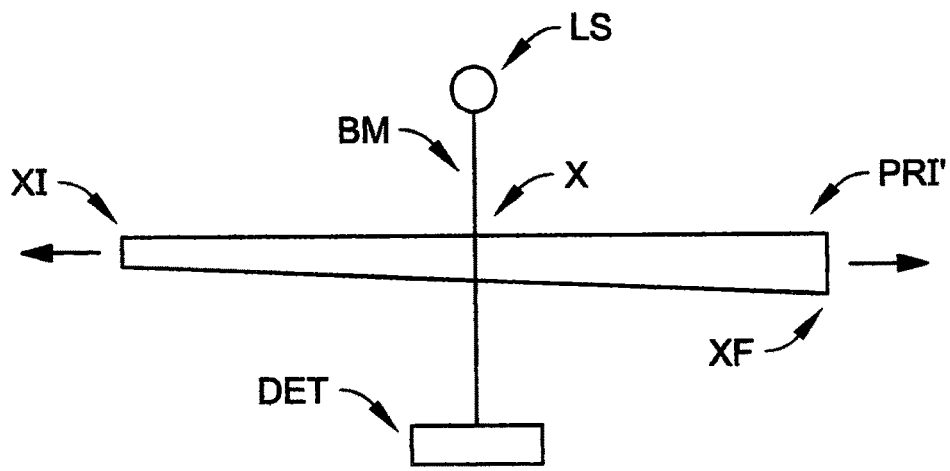
FIG. 13 demonstrates a sample comprised of a demonstrative Semiconductor Substrate having non-parallel. First (F) and Back (B) Sides and a simple system for determining its absorption and extinction coefficient.
Figure 14:
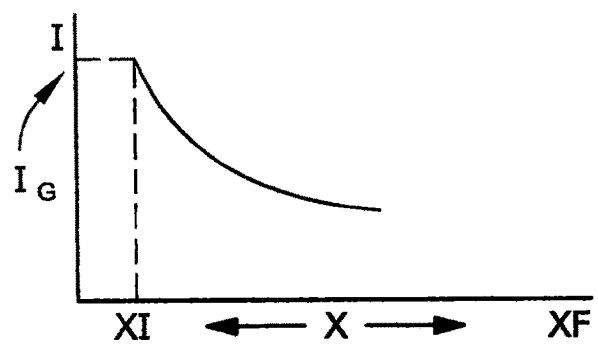
FIG. 14 shows a plot of Intensity vs. position along "X" in FIG. 13.

FIG. 13 demonstrates a sample comprised of a demonstrative Semiconductor Substrate having non-parallel First (F) and Back (B) Sides. (In an exaggerated version said Sample (PRI') can be envisioned as a Prism). Also shown are demonstrative locations of a Source (LS) of Electromagnetic Radiation and a Detector (DET) thereof. Note the simplicity of the System as compared to that of FIGS. 1-12. Also note that a System could be fashioned wherein the Source (LS) of the Beam moves and the Sample (PRI') is stationary. FIG. 14 is included to show they expected plot of Intensity values when the Sample (PRI') is caused to move under the Source (LS) between beginning location (XI) (corresponding to Intensity (I0)), to the left through a sequence of (X) locations, toward (XF). Where a spectroscopic beam is utilized, one such plot will be determined for at least two wavelengths.

Figure 15A:
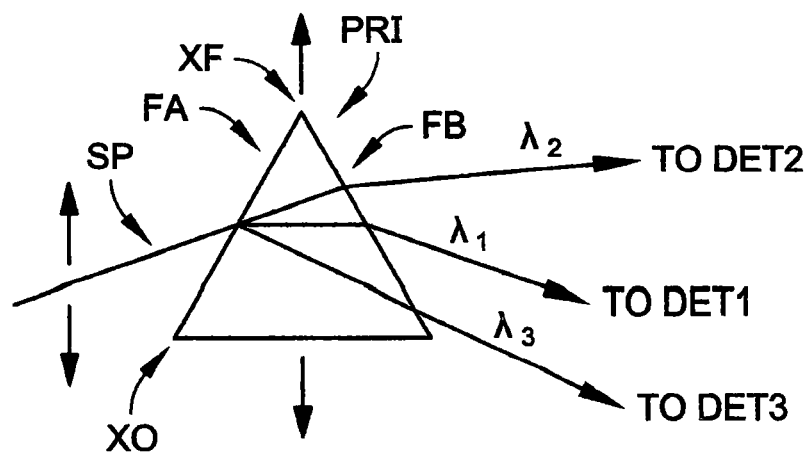
FIGS. 15A-15D show a Prism shaped sample into which a spectroscopic beam of electromagnetic radiation is entered at locations at various positions between X0 and XF.
Figure 15B:
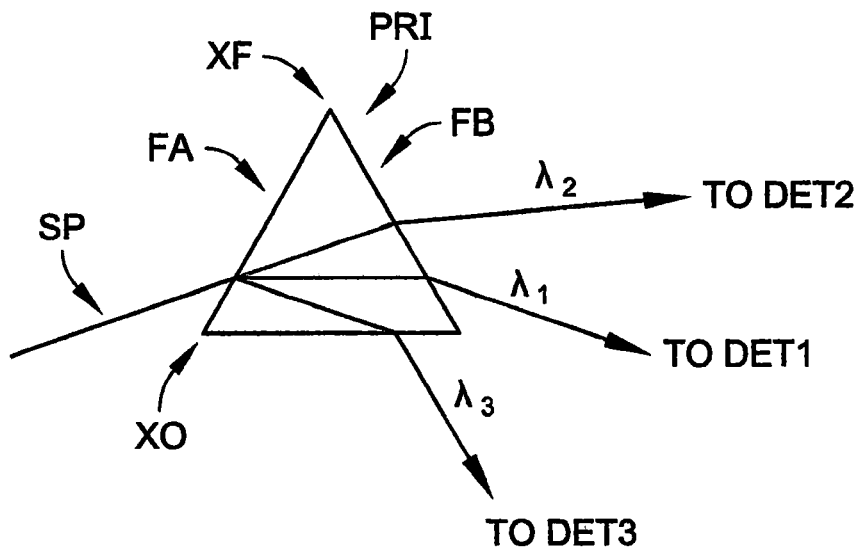
Figure 15C:
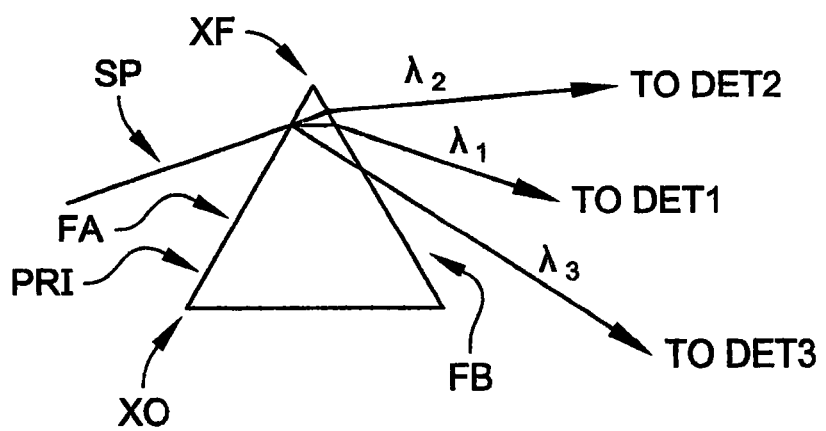
Figure 15D:
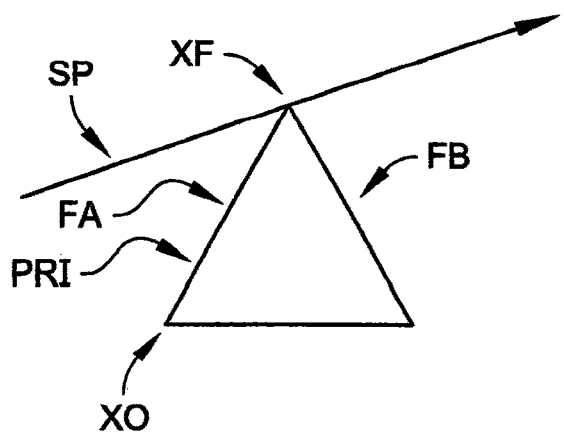
Figure 15E:
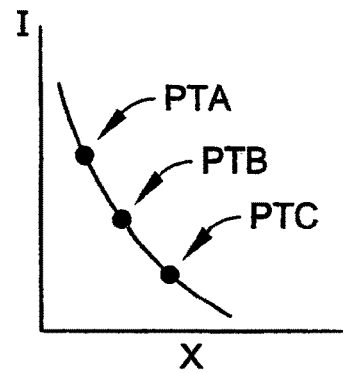
FIG. 15E is a composite of data corresponding to points in FIGS. 15E' 15E" and 15E'" for any wavelength.
Figure 15E:
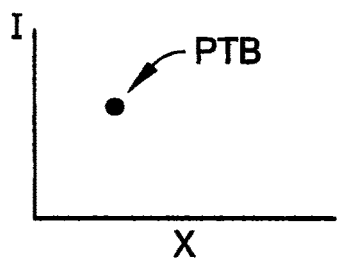
Figure 15E:
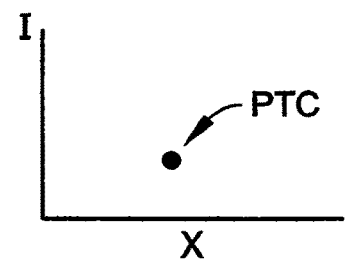
Figure 15E:
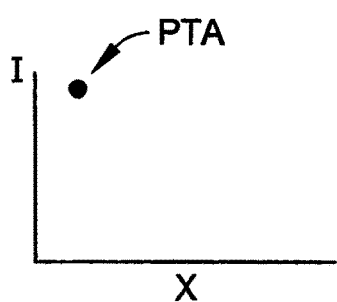

FIGS. 15A-15D show a Prism shaped sample (PRI) into which a Spectroscopic Beam of Electromagnetic Radiation (SP) is entered at locations at various positions between X0 and XF on Face A (FA) thereof. Note that FIG. 15A indicates that the Beam (SP) and/or the Sample Prism (PRI) can be moved with respect to one another. Possible orientations are shown in FIGS. 15A-15D. For a Wavelength 1 the result is demonstrated as a Minimum Deviation condition, though for the purposes of the Present invention this is not a requirement. For wavelengths 2 and 3 minimum deviation is not the case, however all wavelengths that enter the Sample (PRI) generally do progress toward Face B and are then directed into Detectors DET 1, DET 2 and DET 3, unless the Beam (SP) is directed toward the Sample Prism (PRI) as in FIG. 15D, for example. FIG. 15D shows a situation wherein the Beam (SP) misses entering the Sample Prism (PRI). In the FIG. 15D situation no valid Data will be obtained by Detectors DET 1-DET 3, or if the Beam (SP) does reach a Detector it will not contribute a valid Data point as demonstrated in FIG. 15E''''. Any such Data Points are ignored by inspection in the Present Invention Method. That is, if it is obvious that a Data Point cannot contribute to evaluating Parameters in an Exponential Expression, they are deleted. FIGS. 15E' 15E'' 15E''' and 15E'''' demonstrate representative situations for each Wavelength monitored. Note that Data Points "PTA", "PTB" and "PTC" are shown. FIG. 15E demonstrates a composite plot of the results shown in FIGS. 15E' 15E'' and 15E''', and to which a Mathematical Regression can be applied to fit an Exponential Function thereto. It is to be understood that the situation demonstrated is that in which three (3) Data points are obtained, however, it is to be understood that this is not limiting. Any number of Data Points, three (3) or more, can be obtained and the regression applied thereto. Where more than three (3) data points are present one can begin to determine a level of Certainty to which the results are valid.

It is to be appreciated that the actual specific positions of "X", between "X0" and "XF" along Face A (FA) of the Sample Prism (PRI), at which the Beam (SP) enters and to which Data Points PTA, PTB and PTC etc. correspond is not important in the Methodology of the Present Invention. That is accuracy in selecting specific "X" locations between "X0" and "XF" is not a concern. The only thing that is important is that Data Points accumulated when the Beam (SP) is applied at a position "X" between "X" and "XF" can be fit with an Exponential Function. In that light FIG. 15E is included to show a composite of data corresponding to points "PTA", "PTB" and "PTC" in FIGS. 15E' 15E'' and 15E''', each for a monitored wavelength in Beam (SP) being investigated. That is a separate FIG. 15E will be compiled for each Wavelength being simultaneously investigated. The present Method then allows determining Absorption and Extinction Coefficients for multiple Wavelengths simultaneously.

Figure 16:
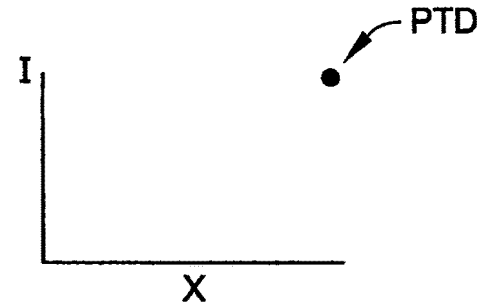
FIG. 16 demonstrates that a loss of Intensity between Input Beam (IB) and Output Beam (OB) occurs because of reflections (R1) and (R2) at interfaces between sample material and a surrounding ambient.
Figure 16:
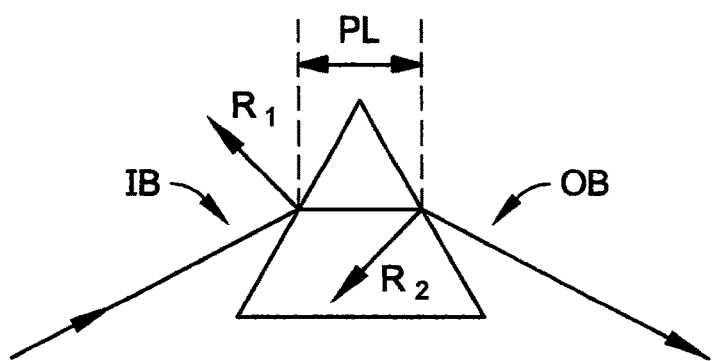

FIG. 16 is included to show that in the Third Method described above, a loss of Intensity between Input Beam (IB) and Output Beam (OB) occurs because of reflections (R1) and (R2). If a measured Output Beam (OB) Intensity is less than expected in view of the reflections (R1) (R2), it is attributed to absorption in the Sample Prism Material overt the Pathlength (PL).

Note that in the Regression based approach the Present Invention requires a much simpler System as the goals are less than in U.S. Pat. No. 10,466,171. That is only Absorption and Extinction Coefficients are desired to be determined. The Refractive Index is not necessarily determined therefore there is not need to determine a Minimum Deviation Angle etc. However in the approach wherein calculation of expected Intensity loss based on reflections at Interfaces is practiced, it is still preferable to achieve a Minimum Deviation Condition.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A method of quickly determining absorption and extinction coefficient of a sample having a front (F) and a back (B) side, said front and back sides being substantially planar but are not parallel to one another, said method comprising the steps of:
    a) providing a sample having a front (F) and a back (B) side, said front and back sides each being substantially planar but are not parallel to one another;
    b) providing:
        a source of a beam of electromagnetic radiation that comprises at least one wavelength which is subjected to absorption in said sample when caused to enter and pass therethrough; and
        a detector of electromagnetic radiation which is sensitive to the at least one wavelength provided said source thereof;
    c) positioning said sample and said source of a beam of electromagnetic radiation such that in use a beam of electromagnetic radiation from said source thereof is caused to enter the front side thereof, pass therethrough, exist the back side thereof, and enter said detector;
    d) while causing the location at which said beam enters said sample to move along a path transversing the front side of said sample by moving said beam and/or said sample such that electromagnetic radiation entering said detector continually increases, or continually decreases as said path is traversed, obtaining a data set relating beam intensity vs. beam position on said sample along said path;
    e) conducting a mathematical regression of an equation:

$I=I0 \exp(-az)$, where $a=(4 \pi k)/\lambda$, I0 is an initial beam intensity, $\lambda$ is wavelength, and k is the extinction coefficient;
onto said data set to the end that the absorption and extinction coefficients are determined.

2. A method as in claim 1 wherein:
    the sample is of a distinct prism shape;
    the beam of electromagnetic radiation at least one wavelength is partially absorbed by passing through said sample;
    said beam of electromagnetic radiation is not perfectly collimated at the location on said sample first side at which it enters said sample;
    said beam of electromagnetic radiation does not enter said front side of said sample at an exact perpendicular angle thereto;
    the source of a beam of electromagnetic radiation is spectroscopic.

3. A method as in claim 1, in which the sample is a semiconductor and the beam energy is below the bandgap thereof.

4. A method as in claim 1, wherein the beam of electromagnetic radiation is spectroscopic and intensity data is accumulated in step d) for a plurality of wavelengths simultaneously, and wherein in step e) regressions are performed for at least two of said plurality of wavelengths to provide absorption and extinction coefficients for each said wavelength.

5. A method of determining the refractive index and absorption coefficient of a prism shaped material at a given wavelength, comprising the steps of:
    a) providing a system comprising:
        a1) a stage for supporting said prism shaped material,
        a2) a source of a beam of electromagnetic radiation:
            mounted directly on a rotatable support arm on a source side of said prism shaped material; or
            mounted other than on a rotatable support arm on a source side of said prism shaped material and also providing a beam directing beam director attached to said support arm on a source side of said prism shaped material;
        and positioning a detector of a beam of electromagnetic radiation:
            mounted directly on a separate rotatable support arm on a detector side of said prism shaped material, or
            mounted other than on a rotatable support arm on a detector side of said prism shaped material and also providing a beam directing beam director attached to said rotatable support arm on a detector side of said prism shaped material;
        each of said sample and detector side rotatable supports being rotatable about a common axis so as to enable directing a beam of electromagnetic radiation provided by said source of a beam of electromagnetic radiation, at various angles of incidence to said source side of said prism shaped material such that it enters said prism shaped material, is refracted thereby, passes through said prism shaped material and exits from said detector side of said prism shaped material at a refracted exit angle to said detector side of said prism shaped material, and then proceeds toward and enters said detector of beam of electromagnetic radiation;
        a3) means for adjusting each of the source side and detector sides rotatable support arms through equal angles by rotation about said common axis; and
        a4) a computer;
    b) mounting a prism shaped material to said stage, said prism shaped material having converging source and detector sides that form an apex angle "A" where they intersect;
    c) while causing said source of a beam of electromagnetic radiation to provide a beam of electromagnetic radiation, rotating said rotatable support arm on said source side of said prism shaped material clockwise or counterclockwise some number of degrees to direct a beam of electromagnetic radiation toward the source side of said prism shaped material at an angle of incidence to said source side thereof, and rotating said separate rotatable support arm on said detector side of said prism shaped material counterclockwise or clockwise respectively, to the same magnitude number of degrees as was the rotatable support arm to which the source is attached and monitoring the intensity of the beam entering said detector as a result;
    d) repeating step c) for multiplicity of additional input beam angles of incidence and monitoring the intensity of the beam entering said detector as a result for each said angle to determine the optimum angle of incidence of said electromagnetic beam with respect to said source side of said prism shaped material at which the detector indicates a maximum intensity; and e) for the optimum maximum intensity angle of incidence determined in step d), in said computer, applying the following formula:

$$n2 = \frac{(\sin((A + (180 - 2(\theta) \text{ optimum angle}))/2))}{\sin(A/2)} n1$$

to determine n2,
where n1 and n2 are the refractive indicies of the ambient environment surrounding said prism shaped material, and of said prism shaped material, respectively;

f) determining the path length that said beam follows in said prism;

g) from the refractive indicies, determining the Fresnel Coefficients and therefrom calculating the expected diminishment in intensity expected as a result of reflections at interfaces between said prism shape sample and an ambient there surrounding;

h) comparing said expected intensity decrease to that measured at said detector;

i) attributing any excess decrease of intensity to absorption in said prism over the length of the beam path therein; and j) having the excess absorption from step i) and path length of the beam in said prism from step f), determining the absorption coefficient "a", from:

$I=I0 \exp(-az)$, and the extinction coefficient "k" from:
a=(4 Pi k)/λ, where I0 is an initial beam intensity, λ is wavelength, and k is the extinction coefficient;
onto said data set to the end that the absorption and extinction coefficients are determined.

6. A method of determining absorption and extinction coefficients for a prism shaped sample comprising the steps of:

a) causing a source of a beam of electromagnetic radiation to direct a beam of electromagnetic radiation toward a prism shaped sample at an angle to a first face thereof;

b) detecting said beam of electromagnetic radiation after it exist said prism shaped sample as an output beam;

c) performing step d) or step e):

d) determine intensities for said output beam for at least three different pathlengths through said prism shaped sample and doing a regression thereof onto:

$I=I0 \exp(-az)$, and the extinction coefficient "k" from:
a=(4 Pi k)/λ, where I0 is an initial beam intensity, λ is wavelength, and k is the extinction coefficient;
to determine absorption a) and extinction k) coefficients;

e) subtracting expected reduction of intensity of said input beam resulting from reflections at interfaces between said prism shaped sample and an ambient there-surrounding, measuring the output intensity of said output beam (OB), and attributing any excess loss of intensity at said detector, over that calculated based on said reflections, and in combination with a measured path length of said beam of electromagnetic radiation through said prism shaped sample determining said absorption a) and extinction k) coefficients.

7. A method as in claim 6, in which step e) further involves determining the minimum deviation condition to aid with determining expected reduction of intensity of said input beam resulting from reflections at interfaces between said prism shaped sample and an ambient there-surrounding.

* * * * *